United States Patent

Tice et al.

[11] Patent Number: 5,534,319
[45] Date of Patent: Jul. 9, 1996

[54] PROTECTIVE SHELL FOR INSULATING PIPES AND FITTINGS

[75] Inventors: Joseph B. Tice, Avon; Antonio A. Diaz, Newington; Dennis P. Manning, Kensington, all of Conn.

[73] Assignee: Bayer Corporation, Pittsburgh, Pa.

[21] Appl. No.: 445,394

[22] Filed: May 19, 1995

Related U.S. Application Data

[62] Division of Ser. No. 194,556, Feb. 10, 1994, abandoned.

[51] Int. Cl.⁶ ............................................. F16L 57/00
[52] U.S. Cl. ........................ 428/36.91; 428/213; 428/421; 428/412; 138/141
[58] Field of Search ................................ 428/36.91, 213, 428/421, 412; 138/141

[56] References Cited

U.S. PATENT DOCUMENTS 4,368,231  1/1983  Egert et al. .............................. 428/220

*Primary Examiner*—Charles R. Nold
*Attorney, Agent, or Firm*—Joseph C. Gil; Aron Preis

[57] ABSTRACT

A shell for protectively enveloping insulation of pipes and pipe fittings is disclosed. The shell comprises a thermoformed laminate of (a) polyvinyl fluoride layer having a thickness of about 0.0015 to 0.004 inch, (b) polycarbonate layer having a thickness of about 0.005 to 0.060 inch and (c) a heat activated, stretchable adhesive layer having a thickness of about 0.0002 to 0.0004 inch interposed between said (a) and said (b).

In a preferred embodiment, the adhesive layer is acrylate based.

3 Claims, No Drawings

PROTECTIVE SHELL FOR INSULATING PIPES AND FITTINGS

This application is a continuation of application Ser. No. 08/194,556 filed Feb. 10, 1994, now abandoned.

FIELD OF THE INVENTION

The invention concerns insulation material and more particularly protective shell suitable for enveloping insulation material and more especially, a shell made of a multi-layered laminate containing polycarbonate and polyvinyl fluoride layers.

SUMMARY OF THE INVENTION

A shell for protectively enveloping the insulation of pipes and fittings is disclosed. Accordingly, the shell comprises a laminate of (a) a layer of polyvinyl fluoride having a thickness of about 0.0015 to 0.004 inch, (b) a layer of polycarbonate having a thickness of about 0.005 to 0.060 inch and (c) a heat-activated, stretchable adhesive layer having a thickness of about 0.0002 to 0.0004 inch interposed between said (a) and said (b). In a preferred embodiment, the adhesive layer is acrylate-based. In a further preferred embodiment, the layer of polyvinyl fluoride contains a UV absorbing agent. The shell of the invention is prepared from a laminated sheet by any of the well known methods of vacuum forming, thermal forming or pressure forming.

BACKGROUND OF THE INVENTION

Pipe and pipe fittings ubiquitous especially in industrial installations are difficult to insulate. In the hostile environment which often entails corrosive agents and elevated temperatures, the currently used PVC jackets are susceptible to melting and are largely unsuitable. Several alternatives have been proposed and tried with mostly undistinguished results; among the alternatives, aluminum and steel jackets represent a substantial economic burden. It has, therefore, been an aim of those skilled in the art to develop an efficient insulation system which would be economical to produce and install and also meet the environmental challenge.

Polyvinyl fluoride (PVF) has long been used in shells in insulating applications in conjunction with aluminum and with fiberglass cloth. No thermoformed, pressure formed or vacuum formed (collectively herein "thermoformed") pipe insulation made of laminated polycarbonate and PVF has to date been disclosed.

DETAILED DESCRIPTION OF THE INVENTION

In accordance with the present invention, there is provided a protective shell prepared by vacuum forming, pressure forming or thermoforming (herein collectively "thermoforming") of a laminate comprising:

(a) a PVF layer having a thickness of about 0.001 to 0.004 inch (b) a polycarbonate (herein "PC") layer having a thickness of about 0.005 to 0.060 inch, and (c) a layer of heat activated stretchable adhesive having a thickness of about 0.0002 to 0.0004 inch interposed between and adhesively connecting said (a) and (b).

The shell is suitable for protectively enveloping insulation material in conjunction with pipes and fittings thereof. In accordance with the present invention, the shell is wrapped around the insulation material which surrounds or otherwise envelopes the pipe or pipe fitting or elbows with the PVF layer on the outside, facing away from the pipe and the insulation. While the shell of the present invention is most suitable in industrial installations, deady it has applications in other sectors, including in commercial and residential piping, fittings and the like.

In a preferred embodiment of the invention, the PVF layer contains a UV absorbing agent. In a further preferred embodiment, the heat activated adhesive is acrylate based.

Preparation of laminates, (the term "laminate" refers to herein to laminate sheets made of several layers including a layer of PVF and PC and an adhesive interposed therebetween)including the presently relevant laminates which contain bonded layers of PC and PVF is well known in the art and is not within the scope of the present invention. Any preparation method which would result in a completely bonded laminate of PVF and PC where the adhesive permits stretching and is capable of successfully withstanding thermoforming is suitable. It is important, however, that the method yields laminates having a surface which is substantially free from deep scratches, folds, creases and foreign contaminating matter, It is also preferred that the laminates thus produced would result in products which are substantially free of air bubbles between the PVF and PC layers. The methods of preparation of laminates of thermoplastic materials include processing by nip rollers and coextrusion which methods are well known in the art.

The thickness of the PVF layer is critical to the invention. It was found that a thickness of about 0.002 inch is optimum for the laminate of the invention although good laminates may be made of PVF having a thickness of 0.001 to 0.004 inch.

Tedlar PVF film, TUT20BG3 a product of E. I. Du Pont De Nemours & Co. of Wilmington, Del. is most suitable for the preparation of the inventive laminate. The properties describing the preferred PVF layer are presented below:

| | |
|---|---|
| unit weight g/sq.m | 66.5 to 73.5 |
| gauge % | 20 max |
| shrink % at 150° C. | 6.0 to 7.0 |
| tensile Kpsi | 13.0 |
| elongation % | 95 |
| Total haze | 18 |
| yellowness - b value | 3.50 |
| volatiles % | 2.00 |

The adhesive layer (c) is typically 0.0002 to 0.0004 inch in thickness. The adhesive suitable in the present context is pressure activated or heat activated. Heat activated acrylate based adhesives are most suitable. It is critical that the adhesive to be used in the preparation of the shell of the invention be stretchable. The term "stretchable" as used here means the capacity of the adhesive to retain its structural integrity upon the stretching which accompanies the thermoforming operation.

A most suitable adhesive is available from E.I. Du Pont De Nemours & Co. under the trade designation Aircraft 68080 adhesive. The properties describing this acrylate based, heat activated adhesive are provided below for reference:

| | |
|---|---|
| weight/gallon | 7.60 |
| solids by weight | 29.0–31.0% |
| viscosity | 17"–57", #15 Parlin Cup |
| Appearance | pale straw colored, low viscosity liquid |
| Reducing solvents | aromatic hydrocarbons |
| laminating temperature | 390–400° F. |
| flash point | –80 L |

Polycarbonates are resins well known in the art and have been available commercially from a number of sources, including under the Makrolon trademark, from Miles Inc. of Pittsburgh, Pa. Grades of Makrolon polycarbonate which are especially suitable for the preparation of laminates are also available from Miles.

Any polycarbonate which is extrudable and appropriate for the preparation of films having the thickness stated above for layer (b) is suitable for the process of the invention. Such grades are known and are readily available in commerce. Flame retardant grades as well as grades which have additionally been rendered resistant to UV radiation-induced degradation are most suitable. Polycarbonate layers having a thickness in the order of 0.005 to 0.060 inch were found to be suitable for the preparation of the thermoformed insulation of the invention.

UV stabilizers which are suitable for inclusion in the PVF layer of the inventive laminate are known in the art. Hindered amines are among the suitable stabilizers.

The invention is further illustrated but is not intended to be limited by the following examples in which all parts and percentages are by weight unless otherwise specified Experimental:

Protective shells in accordance with the present invention have been prepared and their properties determined. Accordingly, laminates were prepared containing a polyvinyl fluoride layer having a thickness of about 0.002 inch (Tedlar PVF film TUT20BG3), a polycarbonate layer having a thickness of about 0.03 inch and a heat activated, stretchable acrylate adhesive layer having a thickness of about 0.0003 inch (DuPont's Aircraft 68080 adhesive) interposed between the PVF and polycarbonate layers. The laminate was prepared by nip-rollers and thermoformed following conventional methods, to a depth of draw of about 8 inch to yield a single piece fitting cover. This configuration enabled the shaping by hand of a 90 degree elbow to accommodate a 2" IPS pipe with 2" of insulation. The elbow was secured with tacks and sealed with tape. The thus insulated pipe was subjected to a hostile environment for the purpose of determining its resistance thereto. A direct comparison of the performance of this shell to the industry standard. 316 stainless steel, showed equivalent results.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A shell for protectively enveloping insulation of pipes and their fittings comprising a thermoformed laminate of
   (a) a layer having a thickness of about 0.0015 to 0.004 inch consisting essentially of polyvinyl fluoride,
   (b) a polycarbonate layer having a thickness of about 0.005 to 0.060 inch and
   (c) a heat activated, stretchable adhesive layer having a thickness of about 0.0002 to 0.0004 inch interposed between said (a) and said (b).

2. The shell of claim 1 wherein said polyvinyl fluoride layer contains a UV absorber.

3. A shell for protectively enveloping insulation of pipes and their fittings comprising a thermoformed laminate of
   (a) a layer having a thickness of about 0.0015 to 0.004 inch consisting essentially of polyvinyl fluoride,
   (b) a polycarbonate layer having a thickness of about 0.005 to 0.060 inch and
   (c) a heat activated, stretchable acrylate based-adhesive layer having a thickness of about 0.0002 to 0.0004 inch interposed between said (a) and said (b).

* * * * *